United States Patent
Lin et al.

(10) Patent No.: US 10,474,323 B2
(45) Date of Patent: Nov. 12, 2019

(54) ORGANIZATIONAL EXTERNAL SHARING OF ELECTRONIC DATA

(71) Applicant: Microsoft Technology Licensing, LLC, Redmond, WA (US)

(72) Inventors: Eugene S. Lin, Seattle, WA (US); Rafael Lopez-Uricoechea, Seattle, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 373 days.

(21) Appl. No.: 15/333,587

(22) Filed: Oct. 25, 2016

(65) Prior Publication Data

US 2018/0115497 A1  Apr. 26, 2018

(51) Int. Cl.
*G06F 15/173* (2006.01)
*G06F 3/0482* (2013.01)
*H04L 29/08* (2006.01)
*G06F 21/62* (2013.01)

(52) U.S. Cl.
CPC ........ *G06F 3/0482* (2013.01); *G06F 21/6218* (2013.01); *H04L 67/02* (2013.01); *G06F 2221/2111* (2013.01)

(58) Field of Classification Search
CPC ....... H04L 47/70; H04L 67/02; G06F 3/0482; G06F 21/6218; G06F 2221/2111
USPC .......................................................... 709/225
See application file for complete search history.

(56) References Cited

U.S. PATENT DOCUMENTS 5,276,901 A * 1/1994 Howell ............... G06F 21/6218
340/5.2
7,376,709 B1   5/2008 Brei et al.
7,730,543 B1 * 6/2010 Nath .................... G06F 21/6218
713/171
8,544,068 B2   9/2013 Yates et al.
8,732,853 B1 * 5/2014 Byrne ................. H04L 63/0838
726/28
8,918,867 B1   12/2014 Salour
(Continued)

FOREIGN PATENT DOCUMENTS

WO   2018111377 A1   6/2018

OTHER PUBLICATIONS

"Skyhigh Compliance", Published on: Mar. 24, 2016 Available at: https://www.skyhighnetworks.com/skyhigh-compliance/.

(Continued)

*Primary Examiner* — Imad Hussain
(74) *Attorney, Agent, or Firm* — Christopher J. Volkmann; Kelly, Holt & Christenson, PLLC

(57) ABSTRACT

A computing system configured to provide access to electronic content includes a processor, a data store, a user interface component, a link generation component, and an access control component. The data store is coupled to the processor and is configured to store the electronic content. The user interface component is configured to receive an indication of an external organization of users with which to share a selected an electronic resource. The link generation component is configured to generate a link to the electronic resource based on the indication of the external organization. The access control component is configured to receive a request via the link to access the electronic resource and to selectively allow access based on whether the requestor is a member of the external organization.

20 Claims, 9 Drawing Sheets

(56) References Cited

U.S. PATENT DOCUMENTS

| | | | |
|---|---|---|---|
| 9,049,176 B2* | 6/2015 | Ferdowsi | H04L 67/06 |
| 9,053,117 B2* | 6/2015 | Trebas | G06F 11/006 |
| 9,208,181 B2 | 12/2015 | Pandey et al. | |
| 9,338,242 B1 | 5/2016 | Suchland et al. | |
| 9,367,646 B2 | 6/2016 | Branton | |
| 9,692,840 B2 | 6/2017 | Fushman et al. | |
| 9,860,255 B2 | 1/2018 | Byrne et al. | |
| 9,934,394 B1* | 4/2018 | Stolboushkin | G06F 21/6218 |
| 10,140,434 B2* | 11/2018 | Lopez-Uricoechea | G06F 21/10 |
| 2005/0138004 A1* | 6/2005 | Teplitsky | G06F 16/9566 |
| 2008/0242221 A1 | 10/2008 | Shapiro et al. | |
| 2009/0320035 A1* | 12/2009 | Ahlgren | G06F 9/468 718/104 |
| 2010/0198871 A1 | 8/2010 | Stiegler et al. | |
| 2011/0258461 A1 | 10/2011 | Bates | |
| 2012/0109836 A1 | 5/2012 | Chen et al. | |
| 2012/0110474 A1* | 5/2012 | Chen | H04W 4/21 715/753 |
| 2012/0136936 A1* | 5/2012 | Quintuna | G06F 21/604 709/204 |
| 2012/0284357 A1* | 11/2012 | Meisels | H04L 67/06 709/217 |
| 2012/0324121 A1* | 12/2012 | Carr | G06Q 50/01 709/229 |
| 2013/0067303 A1 | 3/2013 | Kantor et al. | |
| 2013/0067594 A1* | 3/2013 | Kantor | G06F 21/6218 726/28 |
| 2013/0262559 A1 | 10/2013 | Neerings et al. | |
| 2013/0318589 A1* | 11/2013 | Ford | H04L 63/08 726/7 |
| 2014/0033324 A1* | 1/2014 | Kiang | H04L 63/10 726/27 |
| 2014/0067865 A1* | 3/2014 | Kirigin | H04L 63/10 707/783 |
| 2014/0067929 A1* | 3/2014 | Kirigin | H04L 67/06 709/204 |
| 2014/0215551 A1* | 7/2014 | Allain | H04L 63/10 726/1 |
| 2014/0215568 A1* | 7/2014 | Kirigin | G06F 21/00 726/4 |
| 2014/0282901 A1 | 9/2014 | Dwan et al. | |
| 2014/0282921 A1 | 9/2014 | Filman et al. | |
| 2015/0007264 A1* | 1/2015 | Maldaner | H04L 67/1097 726/3 |
| 2015/0033283 A1* | 1/2015 | Mulder | H04L 63/20 726/1 |
| 2015/0089623 A1 | 3/2015 | Sondhi et al. | |
| 2015/0135337 A1 | 5/2015 | Fushman et al. | |
| 2015/0310188 A1* | 10/2015 | Ford | G06F 21/10 726/28 |
| 2016/0103801 A1* | 4/2016 | Bortz | G06F 17/2235 715/205 |
| 2016/0314314 A1 | 10/2016 | Sirbu et al. | |
| 2017/0323086 A1* | 11/2017 | Lopez-Uricoechea | G06F 21/10 |
| 2017/0364692 A1* | 12/2017 | Lopez-Uricoechea | G06F 3/0484 |
| 2018/0089451 A1* | 3/2018 | Lin | G06F 21/6209 |
| 2018/0115497 A1 | 4/2018 | Lin et al. | |
| 2018/0152460 A1 | 5/2018 | Lin et al. | |
| 2018/0302441 A1* | 10/2018 | Mulder | G06F 16/93 |
| 2018/0343243 A1* | 11/2018 | Shahine | H04L 63/083 |

OTHER PUBLICATIONS

"Squid Access control", Published on: Jan. 13. 2013 Available at: http://www.deckle.co.uk/squid-users-guide/squid-access-control-and-access-control-operators.html.

"Set file sharing permissions", Retrieved on: Sep. 2, 2016 Available at: https://support.google.com/a/answer/60781?hl=en.

"Sharing Files via Link", Retrieved on: Sep. 2, 2016 Available at: http://files.docs.salesforce.com/en-us/1.4.0/help/collab_files_sharing_via_link.htm.

"Share files and folders—Zoho", Retrieved on: Sep. 2, 2016 Available at: https://www.zoho.com/docs/help/file-sharing.html.

"Shared Links: Overview and FAQs", Published on: Jan. 30, 2015 Available at: https://community.box.com/t5/Collaboration-and-Sharing/Shared-Links-Overview-And-FAQs/ta-p/142.

"Share files and folders", Retrieved on: Sep. 2, 2016 Available at: https://support.google.com/docs/answer/2494822?co=GENIE.Platform%3DDesktop&hl=en&oco=1.

Zahavi, et al., "Links as a Service (LaaS): Guaranteed Tenant Isolation in the Shared Cloud", In Proceedings of the Symposium on Architectures for Networking and Communications Systems, Mar. 17, 2016, pp. 87-98.

"Creating Shared Links", Retrieved From: https://web.archive.org/web/20170915184814/https://community.box.com/t5/How-To-Guides-for-Sharing/Shared-Links/ta-p/19523, Jul. 25, 2016, 5 Pages.

"Google Cloud Platform", Retrieved From: http://web.archive.org/web/20150906132830/https:/cloud.google.com/storage/docs/cloud-console, Sep. 6, 2015, 16 Pages.

"OTP Verification", Retrieved From: https://www.drupal.org/project/otp_verification, Mar. 31, 2016, 4 Pages.

"OwnCloud: OwnCloud 9.0 Server Administration Manual", Retrieved From: https://doc.owncloud.org/server/9.0/admin_manual/configuration_files/file_sharing_configuration.html, Retrieved Date: October 24, 2016, 8 Pages.

"Sharing a Link—Amazon WorkDocs", Retrieved From: https://web.archive.org/web/20171129011641/http:/docs.aws.amazon.com:80/workdocs/latest/userguide/web_share_link.html, Nov. 29, 2017, 2 Pages.

"University of Waterloo: Records Management", Retrieved From: https://uwaterloo.ca/records-management/university-waterloo-electronic-recordkeeping-metadata, Oct. 20, 2011, 10 Pages.

"Non Final Office Action Issued in U.S. Appl. No. 15/362,155", dated Sep. 20, 2018, 18 Pages.

"International Search Report and Written Opinion Issued in PCT Application No. PCT/US2017/063165", dated Feb. 21, 2018, 12 Pages.

Stevenson, et al., "Business IT: Do you use Dropbox? Here are some clever tricks", Retrieved From: http://www.bit.com.au/Guide/313558,do-you-use-dropbox-here-are-some-clever-tricks.aspx, Aug. 29, 2012, 7 Pages.

"Final Office Action Issued in U.S. Appl. No. 15/382,155", dated Feb. 20, 2019, 13 Pages.

* cited by examiner

ORGANIZATIONAL EXTERNAL SHARING OF ELECTRONIC DATA

BACKGROUND

Storage of electronic files, such as documents, photos, spreadsheets, presentations, videos, songs, and more is virtually a necessity in modern times. Centralized storage of and access to such files in a network-accessible manner allows the files to be accessed and maintained easily and effectively from a variety of network-connected devices. One form of such storage is an on-line storage platform that is accessible over the Internet and allows users and/or organizations to create accounts with the on-line storage provider in order to securely upload, access, edit, and delete such electronic files.

With the digital storage of electronic files, it is easy to share such files with others in order to collaborate on a document or a project. However, in the context of organizations, sharing of electronic files can present a security risk. If a file is shared with a user outside of the organization (external user) improperly, it may cause a leak of corporate secrets or have other undesirable effects. Accordingly, organizations are highly sensitive to external sharing of electronic files.

The discussion above is merely provided for general background information and is not intended to be used as an aid in determining the scope of the claimed subject matter.

SUMMARY

A computing system configured to provide access to electronic content includes a processor, a data store, a user interface component, a link generation component, and an access control component. The data store is coupled to the processor and is configured to store the electronic content. The user interface component is configured to receive an indication of an external organization of users with which to share a selected an electronic resource. The link generation component is configured to generate a link to the electronic resource based on the indication of the external organization. The access control component is configured to receive a request via the link to access the electronic resource and to selectively allow access based on whether the requestor is a member of the external organization.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
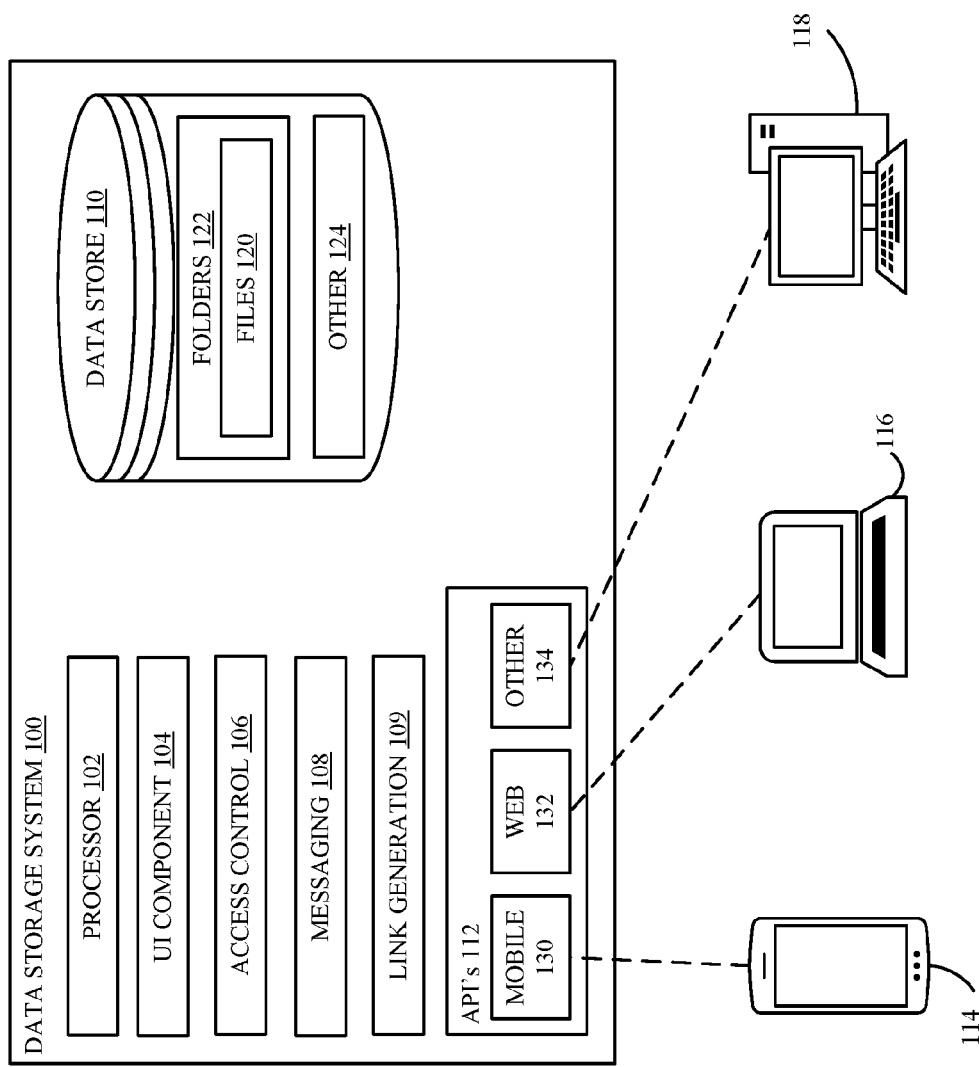
FIG. 1 is a diagrammatic view of a network-accessible data storage system with which embodiments described herein are particularly useful.

As set forth above, many organizations are concerned about external sharing of files that may lead to leaking corporate secrets. Such sensitivity regarding file sharing creates inefficiencies for users wishing to share electronic files with a significant number of entities in an external organization. For example, if a potential sharer of an electronic resource wishes to share a cloud resource (file, folder, document, site, etc.) with a set of people in another tenant (i.e. "external organization") (company, school or other organization), the sharer may not know all the identities of the people in the external organization that need to have access to the electronic resource; they just want to send a link that can be freely shared within the external organization. The sharer also wants to make sure the link cannot be used by people who are not members of the external organization.

Currently, users of file sync and share services have only two options for partially solving the problem set forth above. First, the sharer could create an anonymous link, which would satisfy the requirement of being freely sharable within the external organization. However, this would not solve the problem of making the link inaccessible by people who are not members of the external organization since anonymous links can be used by anyone in the world. The second option is for the sharer to permission every user they know of in the external organization and send a canonical link (a link that respects the permission of the resource). This solves the problem of making the link inaccessible by people who are not members of the external organization. However, it does not solve the problem of making the link freely sharable within the external organization, since it will only work for the people the sharer explicitly added to the permissions list.

Embodiments disclosed herein generally provide an external sharing solution for electronic data where a sharer may select an external organization or domain and generate a link that is operable to share with any member of the selected external organization or domain. When a user to whom the link has been provided attempts to open the link, they are required to authenticate with the electronic data storage system, if they are not already authenticated. The data system checks the user's identity (e.g. the username of their login) to see whether the identity meets the criteria of the link. If the username matches (e.g. their email address domain matches one of the allowed email domains in the link) then they are granted access. Otherwise they are denied.

While embodiments described herein generally have wide applicability to any electronic system that is able to store electronic files and allow multiple users to selectively access and share such electronic files, the remainder of this description will be described with respect to an on-line data storage system that is accessible over the Internet. This embodiment is considered a cloud computing embodiment.

Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of the architecture as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

FIG. 1 is a diagrammatic view of an on-line data storage system with which embodiments described herein are particularly useful. Data storage system 100 includes processor 102, user interface (UI) component 104, access control component 106, messaging component 108, and data store 110. Additionally, while not specifically shown in FIG. 1, data storage system 100 includes suitable circuitry or other arrangements to enable data storage provider 100 to connect to a network in order to provide access to devices 114, 116, and 118. Each of devices 114, 116, and 118 couples to or interacts with data storage system 100 via a suitable application programming interface 112. For example, mobile device 114 interacts with data storage system 100 through mobile device application API 130 while laptop computer 116 may interact with data storage system 100 via web API 132. Further still, it is expressly contemplated that other devices, such as computer 118, may interact with data storage system 100 via other API 134. Regardless, in one embodiment, all such interactions with data storage system 100 via the variety of user devices are through suitable application programming interfaces 112 appropriate for that particular modality.

Processor 102 is illustratively a computer processor that has associated memory and timing circuitry, not separately shown. Processor 102 is illustratively a functional part of data storage system 100 and facilitates the functionality of data storage system 100 in providing access to data in data store 110.

UI component 104 is illustratively controlled by other components, servers, or items in data storage provider 100 in order to generate user interface displays for users using devices 114, 116, and 118. Devices 114, 116, and 118 are merely provided as examples of various user devices that may be used to interact with system 100. In the illustrated example, device 114 is a mobile device, such as a smartphone; device 116 is a laptop or notebook computer; and device 118 is a desktop computer. It will be noted, however, there can also be a user interface component on devices 114, 116, and 118 which generates those user interface displays as well. Further, it will be noted that user interface component 104 can generate the user interface displays itself, or under the control of other items shown in FIG. 1.

The user interface displays illustratively include user input mechanisms that allow the users to control and manipulate data storage provider 100, in order to upload, access, share, and manage electronic files stored within data store 110. The user input mechanisms can include a wide variety of different types of user input mechanisms, such as links, icons, buttons, drop down menus, text boxes, check boxes, etc. In addition, the user input mechanisms can be actuated by the user in a wide variety of different ways. For instance, they can be actuated using touch gestures (where the display is touch sensitive), a hard or soft keyboard or keypad, a point and click device (such as a mouse or trackball), buttons, joysticks, or other actuators. Additionally, where data storage provider 100 or one of devices 114, 116, and 118 has speech recognition components, the user input mechanisms can also be actuated by using voice commands.

Access control component 106 may employ an access control list or other suitable structure that includes information that indicates permissions or access rights for each user or group of users that are able to use data storage provider 100. Additionally, access control component 106 may maintain a list of authorized users for each organization or tenant for which data storage provider 100 provides data storage services. In one embodiment, access control component 106 can provide digital directory services in order to authenticate and authorize users and/or various devices 114, 116, and 118. Accordingly, a list of users within the organization (i.e. internal users) will be maintained by access control component 106, thereby allowing access control component 106 to identify other users (outside of the organization) as any user who is not listed as a member of the particular organization. Such users are considered to be external users. Sharing electronics files with external users can be a security risk for an organization, and should be carefully controlled. Access control component 106 may also include a listing of one or more domains or tenants, and organizational content scope information indicating whether external sharing is allowed for that particular domain or tenant.

Messaging component 108 may include a messaging server or other suitable device or logic that is able to compose and/or send messages to users. Accordingly, messaging component 108 may include an e-mail server that supports the known Simple Mail Transfer Protocol (SMTP). However, messaging component 108 may also include an instant messaging server (SMS) or any other device or logic that is able to provide messages to users. Further still, in embodiments where access to data storage provider 100 is provided to one or more of devices 114, 116, and 118 via an application executing upon said devices. Messaging component 108 may include code and/or suitable circuitry to surface such messages or notifications within the application executing upon such user devices. While messaging component 108 is shown as a component of data storage provider 100, it is expressly contemplated that messaging component 108 may be remote from data storage provider 100 and controlled or otherwise engaged by data storage system 100 to generate suitable messages, such as external sharing invitations.

Link generation component 109 is configured to generate a sharing links to the electronic resource stored or otherwise managed by data storage system 100. When a user selects one or more electronic resources of the data storage system and defines how the electronic resource(s) should be shared, both internally and/or externally, link generation 109 generates a link that may be distributed or communicated to various users to allow such users to access the one or more electronic resources.

Data store 110 is shown as a single data store that is local to data storage provider 100. However, it will be noted that data store 110, in actuality, may be comprised of a number of different data stores, all of which may be local to data storage provider 100, some of which may be local to data storage provider 100, or all of which may be remote therefrom. Data store 110 illustratively stores a number of electronic files 120 within folders 122. However, other forms of data 124 may also be stored by data store 110 and made available by data storage provider 100 for access by users.

Figure 2:
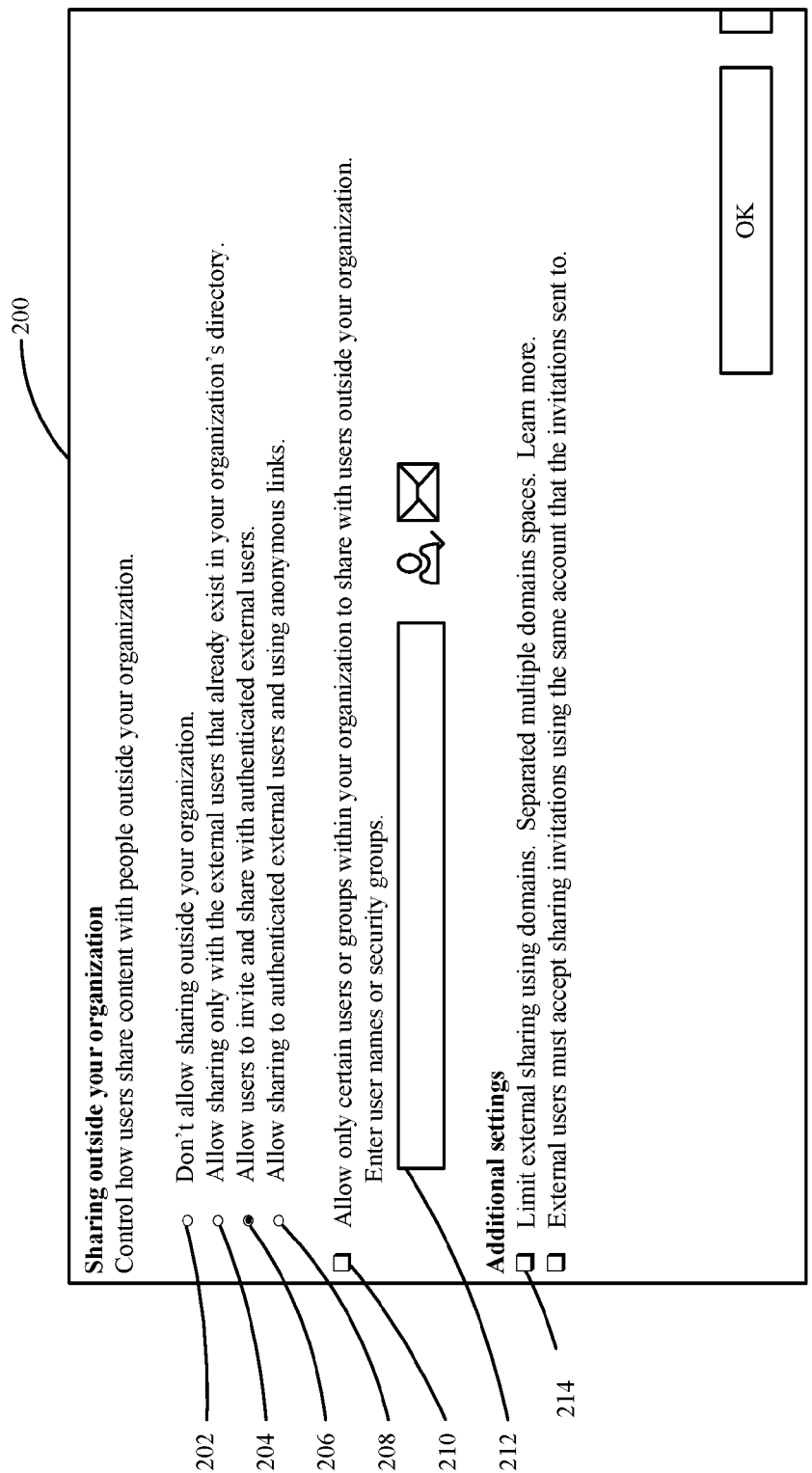
FIG. 2 is a diagrammatic view of an administrative console in accordance with one embodiment.

FIG. 2 is a diagrammatic view of an administration console 200 provided to an administrator by data storage system 100 via UI component 104. Administration console 200 may be displayed by whichever device 114, 116, and 118 administrator 150 is using. Console 200 provides the administrator with a number of options regarding how users may share content with people outside of the organization. As indicated at user interface element 202, the administrator may select that no sharing is allowed outside of the organization. Another option is indicated at user interface element 204 where, upon selection, sharing will only be allowed with external users that already exist in the organization's directory. In the example illustrated in FIG. 2, the administrator has selected user interface element 206 such that users of the organization will be allowed to invite and share with authenticated external users. Another option is illustrated at user interface element 208 where the administrator can allow sharing to external users using anonymous access links. Additionally, the administrator can select user interface element 214 in order to limit external sharing using domains.

FIG. 3 is a diagrammatic view of a user interface provided to an organizational user of data storage system 100 in accordance with one embodiment. As shown in user interface 300, the user may have a primary display portion 302 that shows a number of files and folders to which the user has access. In the example shown in FIG. 3, the user has selected a file entitled "Sales 2015 Presentation.pptx" for sharing. When the user has selected a particular electronic resource, such as Sales 2015 Presentation.pptx, the user will be provided with an interface to determine what users or entities will be allowed to access the sharing link. In the illustrated example, the user has selected an internal user named Eugene, as well as all users of an external organization "fabrikam.com." This selection of all users of an external domain can be done in any suitable manner, however, in the example provided, the user has provided wildcard identifier 310 such that any user authenticating with the fabrikam.com domain will be able to use the link to access the selected electronic resource. Criteria for the link could also or alternatively be based on either an allow-list or a deny-list of domains. The domains could be matched against the email addresses used to sign-in by anyone who attempts to open the link.

In one embodiment, the data storage system allows regular expression matching against the usernames of people attempting to open the link. This allows for more granular permissions such as checking subdomains (e.g. allow @partners.fabrikam.com but not @fabrikam.com or t-*@partners.fabrikam.com.

Alternatively, the set of allowed external organizations could be specified explicitly by choosing from a list of tenants or searching for tenants by name. In that case, the identities of the users who open the link would be checked explicitly against the allowed or denied tenants. This solution works better in cases where the usernames are not email addresses, or for external organizations that have users whose usernames do not match the organization's domain.

Once the user has finished specifying the criteria for the link, user interface element 208 is selected and the link is generated. The link is supplied directly to the user for communication to one or more people. Additionally, or alternatively, where link criteria specify at least one individual user and a communication endpoint for that user (e.g. an email address), messaging component 108 may generate an automatic communication to the user providing the newly-generated hyperlink.

Figure 3A:
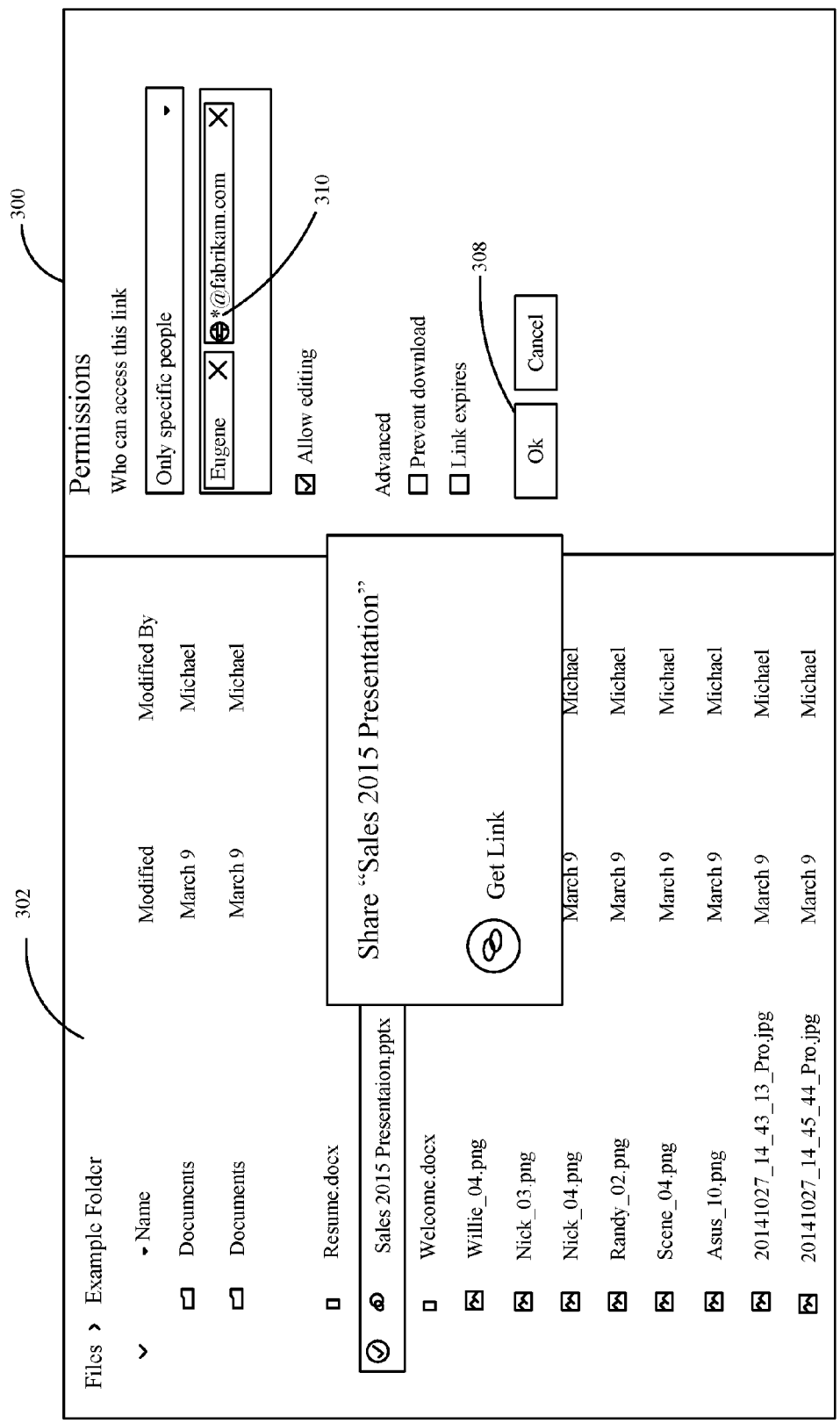
FIG. 3A is a diagrammatic view of a user interface of a user attempting to share a file externally in accordance with one embodiment.
Figure 3B:
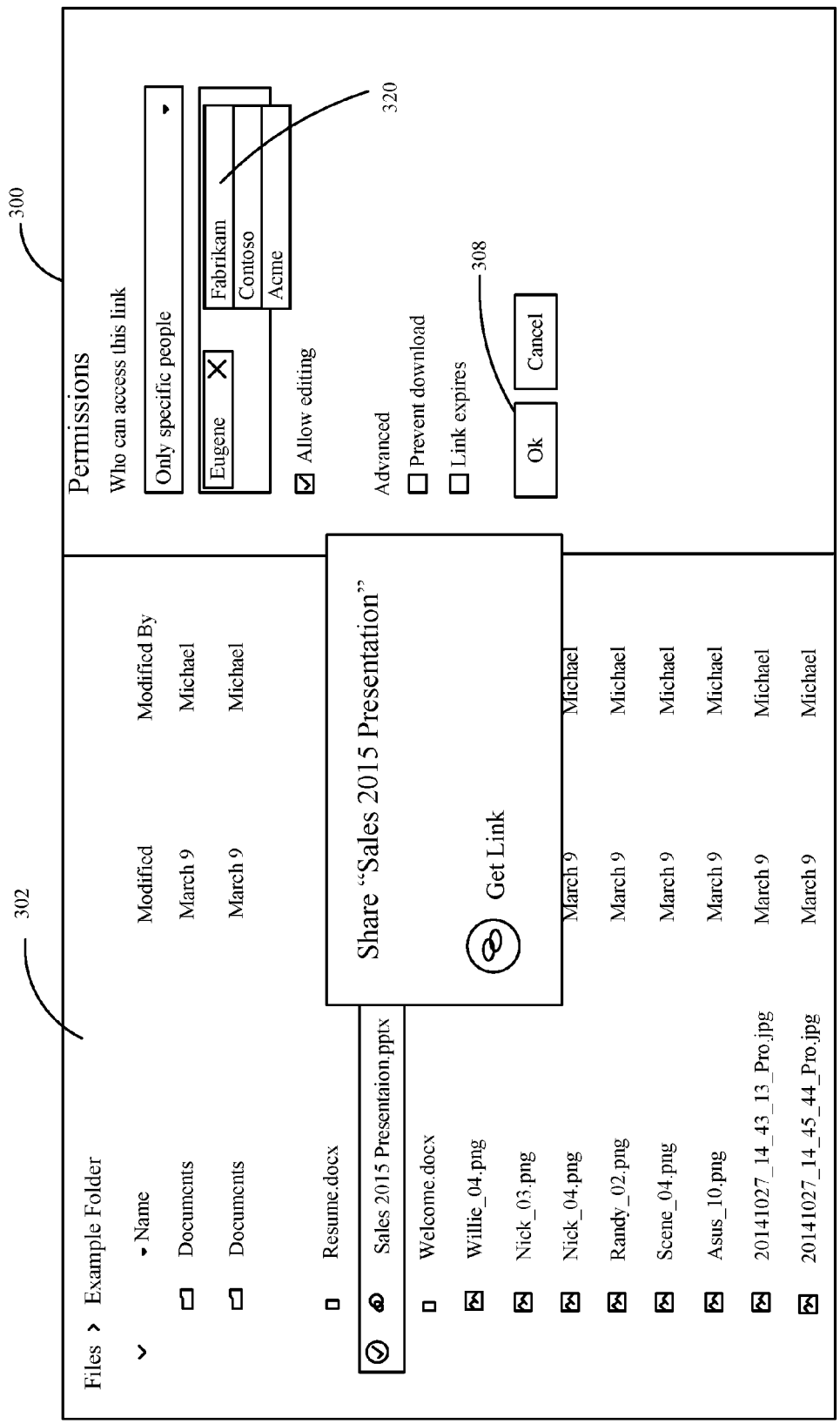
FIG. 3B is a diagrammatic view of a user interface of a user attempting to share a file externally in accordance with one embodiment.

FIG. 3B is a diagrammatic view of a user interface of a user attempting to share a file externally in accordance with one embodiment. The embodiment illustrated in FIG. 3B is similar to that of FIG. 3A and like components are numbered similarly. Additionally, while the embodiment described with respect to FIG. 3B is described as providing an alternative manner in which to specify an external organization in a sharing link, it is expressly contemplated that the embodiments of FIGS. 3A and 3B can be combined to allow specification of external organizations both by email domain, such as indicated in FIG. 3A and directly, as set forth in FIG. 3B.

The embodiment described with respect to FIG. 3A is particularly useful when users of the data storage system are identified by their email address where the email address provides an indication of their domain membership (i.e. user@fabrikam.com). However, there are a growing number of situations where the user may be identified by a different email address than the domain to which they belong, or they may not be identified by an email address at all, such as a username or biometric identifier. In such instances, as long as the domain to which the recipient of the link belongs is a domain for which the data storage system provides services to the sharer. For example, if the sharer is a member of organization A and the sharer selects organization B for domain-based access to an electronic resource, then as long as organization B is a tenant of the data storage system such that the data storage system has a mapping of individual users who belong to organization B, then as long as a user properly authenticates with the data storage system (using any appropriate login method or technique) the user will have access to the electronic resource of the link. Accordingly, FIG. 3B shows that the user has, in the permissions section relative to the selected file, a listing of available organizations for which data storage system 100 has user membership information. Typically, this will be because the particular organization, such as Fabrikam, also uses data storage system 100 for its data storage services. Thus, although Fabrikam is an external domain for the user, it may be selected directly for domain-based external sharing, as indicated at reference numeral 320.

Figure 4:
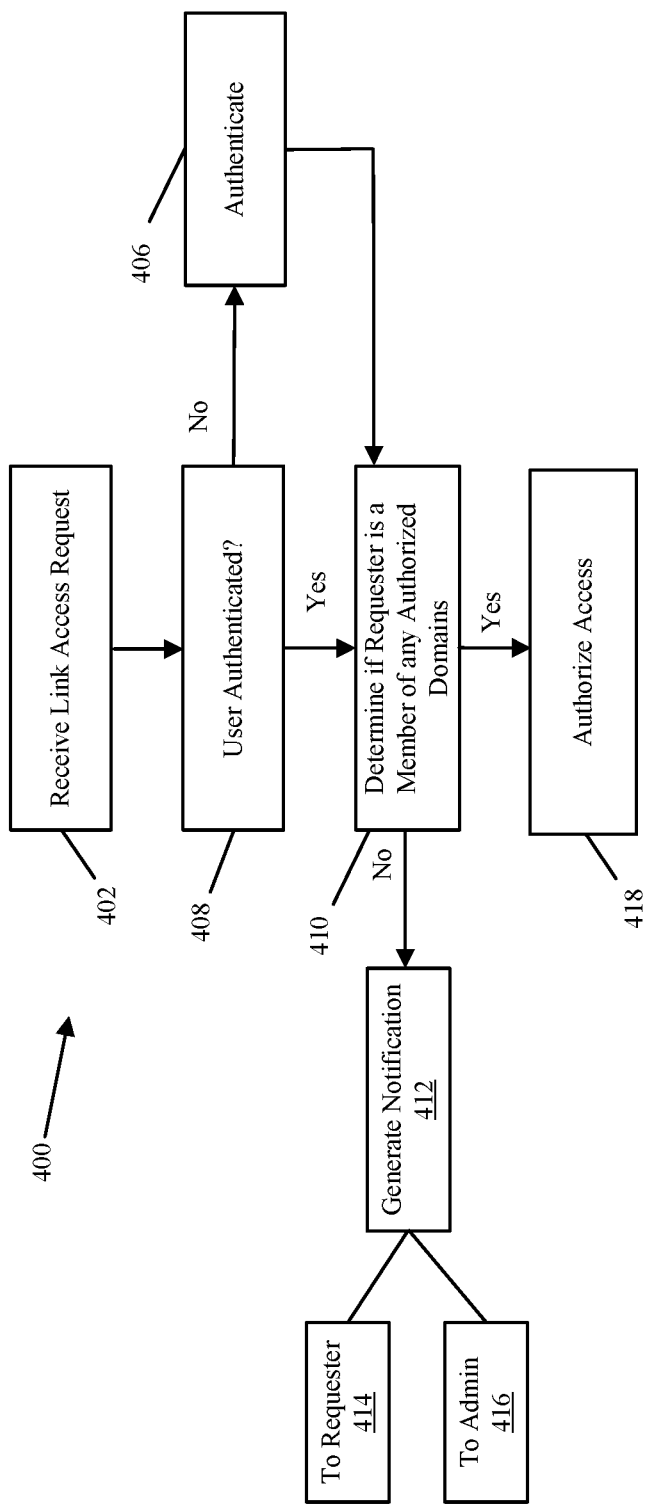
FIG. 4 is a flow diagram of a method of processing a link access request with an electronic data storage system in accordance with one embodiment.

FIG. 4 is a flow diagram of a method of processing a link access request with an electronic data storage system in accordance with one embodiment. Method 400 begins at block 402 where a data storage system receives request to access an electronic resource stored or otherwise maintained by the data storage system. This request may be in the form of an external user supplying a previously-generated sharing link (such as that described with respect to FIG. 3) in an electronic communication, such as an http request. In one embodiment, a web server component of data storage system 100 receives the request and engages UI component 104 and access control component 106 to determine whether the user submitting the request is already authenticated, as indicated at block 408. If not, control passes to block 406, where a login display is provided to the user in order to log in to the data storage system 100. Once the user has logged in, or if the user was already logged in, control passes to block 410 where data storage system 100 determines if the user is a member of one or more domains for which sharing of the link is authorized. The listing of domains and/or sub-domains for which access to the link is available can be stored in a database or any suitable data storage technology relative to each sharing link generated by data storage system 100. Thus, the incoming link may include an index or other suitable identifier that allows data storage system 100 to access information relative to the link, such as authorized sharing entities (e.g. individual users, domains and/or subdomains) and compare the user's identity and/or domain memberships with that allowed for access. If the user is not a member of an allowed domain or subdomain for the link or a specifically permissioned user, control passes to block 412 where a notification is generated. Such notification can be provided to the user, as indicated at block 414. Additionally, or alternatively, the notification can be provided to an administrator or other suitable party responsible for protecting the electronic content from inadvertent or unauthorized disclosure. On the other hand, if the user is allowed to access the electronic resource to which the sharing link is directed, then control passes to block 426, where such access is granted.

As set forth above, description of the various embodiments generally provides the generation and utilization of a sharing link that can be permissioned to anyone in specific external organizations (rather than individual users). Moreover, a data storage system is configured to support sharing of electronic resources, such as cloud items, with only people in specific organizations without needing to know all the identities of members of those organizations.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
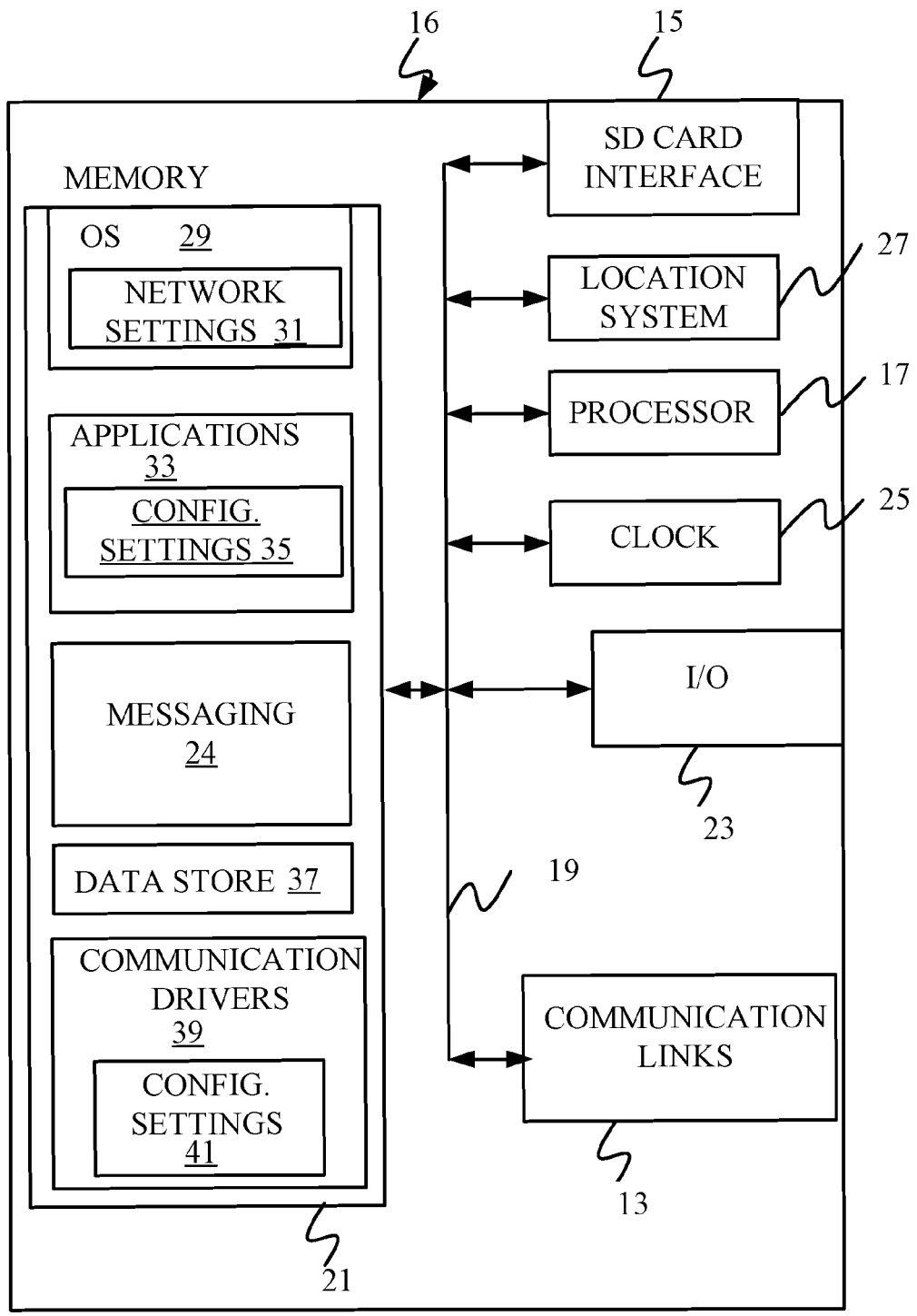
FIG. 5 provides a general block diagram of the components of a client device that can run components of the data storage system to interact with the data storage system.
Figure 6:
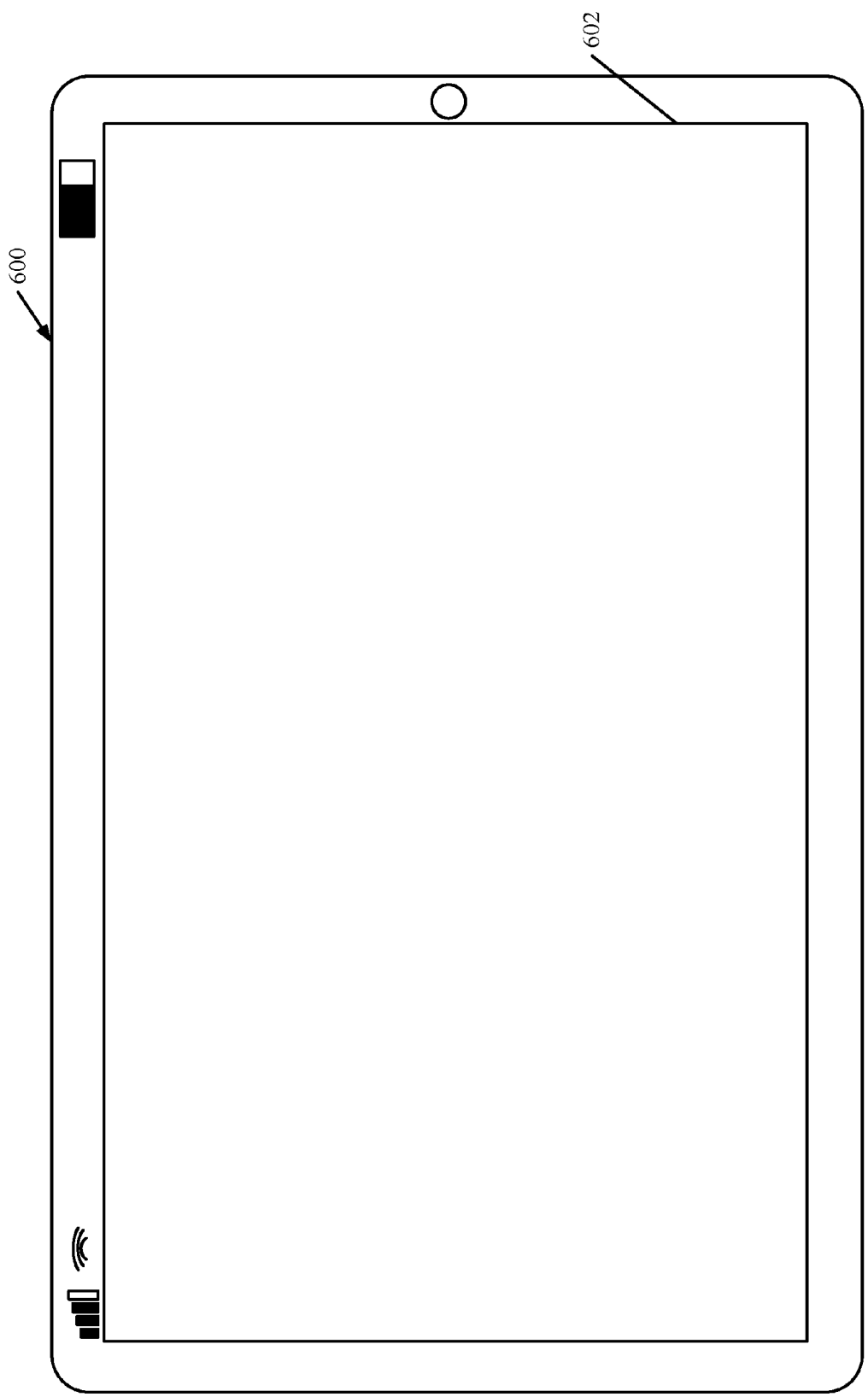
FIGS. 6 and 7 are diagrammatic views client devices that can run components of the data storage system to interact with the data storage system.
Figure 7:
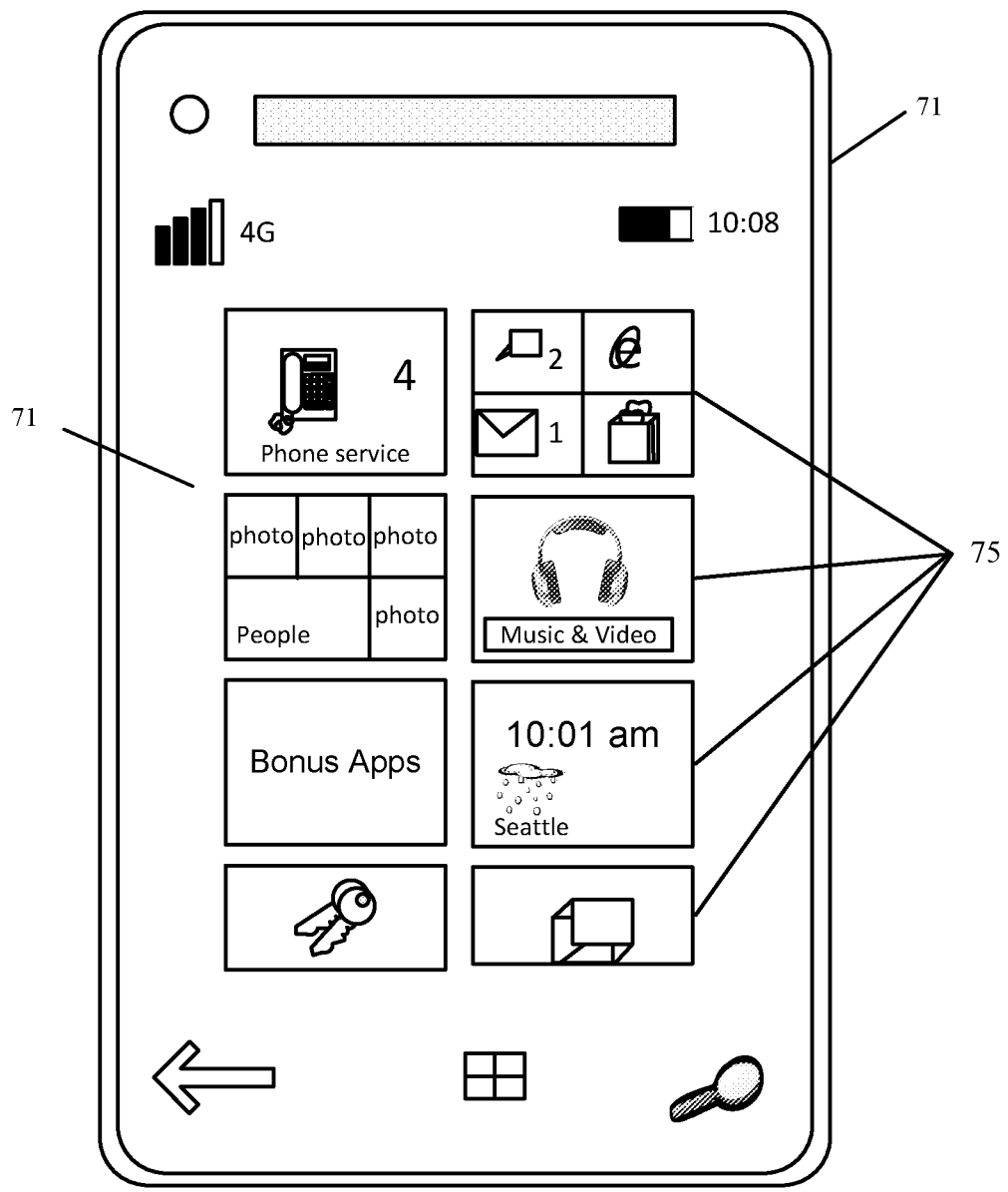

FIG. 5 is a simplified block diagram of one illustrative embodiment of a handheld or mobile computing device that can be used as a user's or client's hand held device 16, in which the present system (or parts of it) can be deployed. FIGS. 6 and 7 are examples of handheld or mobile devices.

FIG. 5 provides a general block diagram of the components of a client device 16 that can run components of data storage system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like messaging application 24) are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Memory 21 can also store messaging application 24 in order to allow the user to send and receive electronic messages. Additionally, memory 21 can also store a dedicated application that allows the user to interact with online storage system 100 through a suitable application programming interface.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 8:
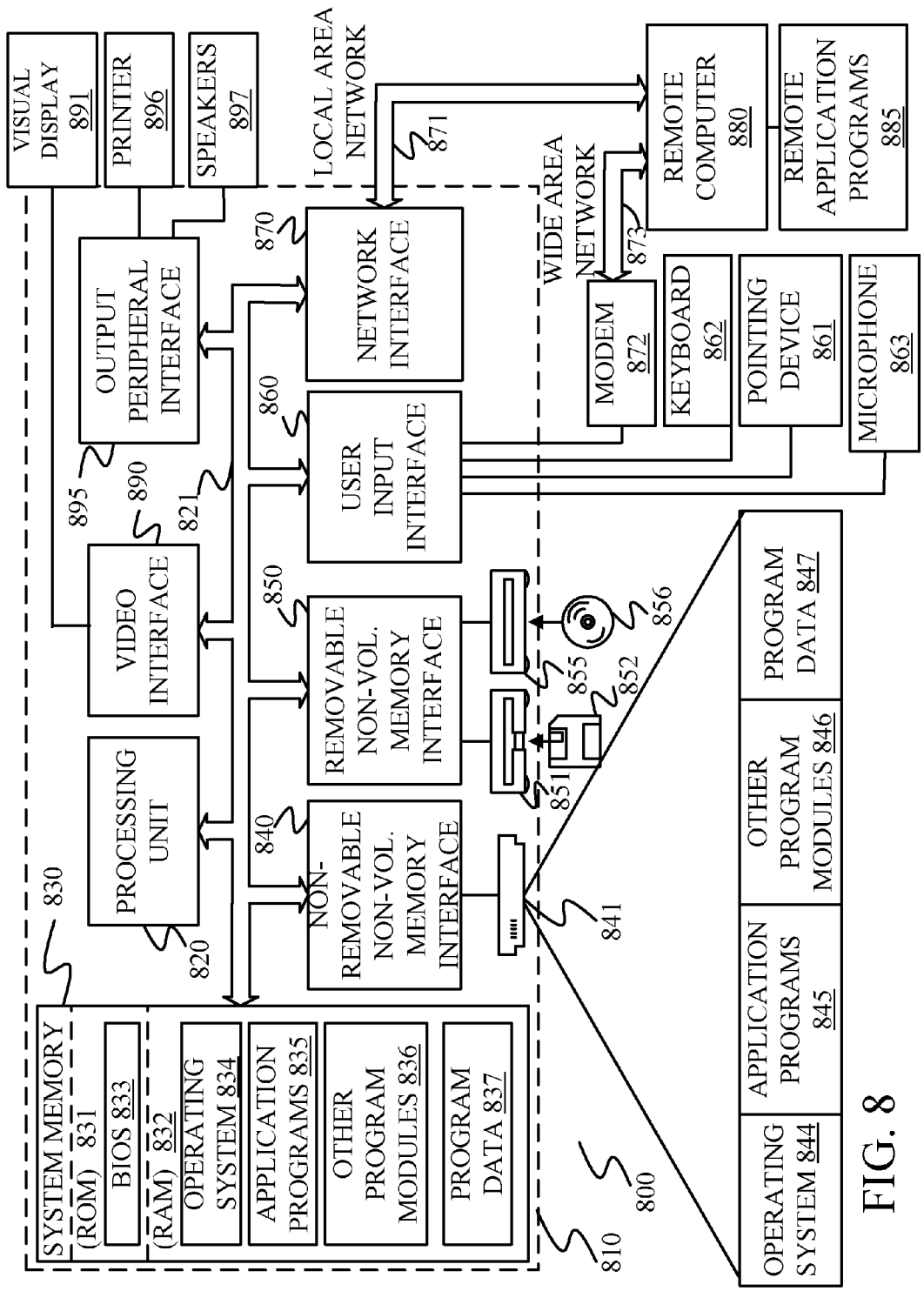
FIG. 8 is a general block diagram of a computing device that can run components of a data access system or client device that interacts with the data access system, or both.

FIG. 6 shows one embodiment in which device 16 is a tablet computer 600. In FIG. 8, computer 600 is shown with display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 7 is a diagrammatic view of another mobile device in which embodiments described herein are particularly useful. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. Note that other forms of the devices 16 are possible.

FIG. 8 is one embodiment of a computing environment in which architecture 100, or parts of it, (for example) can be deployed. With reference to FIG. 8, an exemplary system for implementing some embodiments includes a general-purpose computing device in the form of a computer 810. Components of computer 810 may include, but are not limited to, a processing unit 820, system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system configured to provide access to electronic content. The computing system includes a processor, a data store, a user interface component, a link generation component, and an access control component. The data store is coupled to the processor and is configured to store the electronic content. The user interface component is configured to receive an indication of an external organization of users with which to share a selected an electronic resource. The link generation component is configured to generate a link to the electronic resource based on the indication of the external organization. The access control component is configured to receive a request via the link to access the electronic resource and to selectively allow access based on whether the requestor is a member of the external organization.

Example 2 is the computing system of any or all previous examples wherein the user interface component is configured to receive a selection of an external plurality of users without requiring an identification of every such user.

Example 3 is the computing system of any or all previous examples wherein the selection of the external plurality of users is based on a domain of the organization.

Example 4 is the computing system of any or all previous examples wherein the selection of the external plurality of users includes receiving at least one wildcard character.

Example 5 is the computing system of any or all previous examples wherein the selection of the external plurality of users includes an email address having the at least one wildcard character.

Example 6 is the computing system of any or all previous examples wherein the selection of the external plurality of users includes receiving a selection of an organization for which user membership information is available to the data storage system.

Example 7 is the computing system of any or all previous examples wherein the user membership information is a digital directory maintained by the computing system.

Example 8 is the computing system of any or all previous examples wherein the external organization is a tenant of the computing system.

Example 9 is the computing system of any or all previous examples wherein the processor is configured to engage the access control component to determine if an authenticated user requesting access to the electronic resource is a member of the external organization based on a digital directory.

Example 10 is the computing system of any or all previous examples wherein the authenticated user has a username that does not indicate domain membership.

Example 11 is a computing system configured to provide access to electronic content. The computing system includes a processor, a data store, an access control component, and a user interface component. The data store is coupled to the processor and is configured to store the electronic content. The access control component is configured to receive a link requesting access to an electronic resource stored in the data store. The user interface component is coupled to the processor and is configured to generate a user interface allowing the requestor to authenticate with the computing system. The access control component is configured to determine whether the authenticated requestor is a member of an external domain specified relative to the link as being allowed to access the electronic content and to selectively allow such access based on the membership.

Example 12 is the computing system of any or all previous examples wherein the user interface is configured to receive an email address of the requestor and to determine whether a domain of the email address is the external domain specified relative to the link.

Example 13 is the computing system of any or all previous examples wherein data correlating the link with an indication the external organization is stored within the data store.

Example 14 is the computing system of any or all previous examples wherein the access control component is configured to access a digital directory that lists users of the external domain to determine whether the requestor is a member of the external domain.

Example 15 is a computer-implemented method of sharing electronic content using a data storage system. The method includes receiving a request from an internal user to share electronic content stored in the data storage system with a limited plurality of external users without specifying every such external user. A link is generated having a link identifier. Information is stored correlating the link identifier and information indicative of the electronic content and identification of the limited plurality of external users.

Example 16 is the computer-implemented method of any or all previous examples wherein the limited plurality of external users is specified by an email address having a wildcard character.

Example 17 is the computer-implemented method of any or all previous examples wherein the limited plurality of external users is specified as an organization.

Example 18 is the computer-implemented method of any or all previous examples and further comprising receiving a hypertext transfer protocol message with the link from a requestor and causing the requestor to authenticate to the data storage system with an identity.

Example 19 is the computer-implemented method of any or all previous examples and further comprising accessing, with the data storage system, the information indicative of the limited plurality of users and determining whether the requestor's identity is a member of the limited plurality of external users.

Example 20 is the computer-implemented method of any or all previous examples wherein determining whether the requestor's identity is a member of the limited plurality of external users is based on whether an email address of the requestor has a domain that is specified in the information indicative of the limited plurality of users.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system configured to provide access to electronic content, the system comprising:
    a processor;
    a data store coupled to the processor and configured to store the electronic content;
    a user interface component configured to receive an indication of an external organization of users with which to share a selected electronic resource;
    a link generation component configured to generate a link to the electronic resource based on the indication of the external organization; and
    an access control component configured to:
        receive a request via the link to access the electronic resource;
        identify a requesting user associated with the request to access the electronic resource;
        based on the received request, identify membership information associated with the external organization;
        based on the membership information, determine whether the requesting user is a member of the external organization; and
        selectively allow access by the requesting user to the selected resource based on the determination.

2. The computing system of claim 1, wherein the user interface component is configured to receive a selection of an external plurality of users without requiring an identification of every such user.

3. The computing system of claim 2, wherein the selection of the external plurality of users is based on a domain of the organization.

4. The computing system of claim 2, wherein the selection of the external plurality of users includes receiving at least one wildcard character.

5. The computing system of claim 4, wherein the selection of the external plurality of users includes an email address having the at least one wildcard character.

6. The computing system of claim 2, wherein the selection of the external plurality of users includes receiving a selection of an organization for which user membership information is available.

7. The computing system of claim 6, wherein the user membership information is a digital directory maintained by the computing system.

8. The computing system of claim 1, wherein the external organization is a tenant of the computing system.

9. The computing system of claim 8, wherein the processor is configured to engage the access control component to determine if an authenticated user requesting access to the electronic resource is a member of the external organization based on a digital directory.

10. The computing system of claim 9, wherein the authenticated user has a username that does not indicate domain membership.

11. A computing system configured to provide access to electronic content, the system comprising:
    a processor;
    a data store coupled to the processor and configured to store the electronic content;
    an access control component configured to receive a link requesting access to an electronic resource stored in the data store;
    a user interface component coupled to the processor and configured to generate a user interface allowing the requestor to authenticate with the computing system; and wherein the access control component is configured to:
    access membership information associated with an external domain specified relative to the link as being allowed to access the electronic resource;
    based on the membership information, determine that the authenticated requestor is a member of the external domain; and
    selectively allow access by the authenticated requestor to the electronic resource.

12. The computing system of claim 11, wherein the user interface is configured to receive an email address of the requestor and to determine whether a domain of the email address is the external domain specified relative to the link.

13. The computing system of claim 12, wherein data correlating the link with an indication the external organization is stored within the data store.

14. The computing system of claim 1, wherein the access control component is configured to access a digital directory that lists users of the external domain to determine whether the requestor is a member of the external domain.

15. A computer-implemented method of sharing electronic content using a data storage system, the method comprising:
    receiving a request from an internal user to share electronic content stored in the data storage system with a limited plurality of external users without specifying every such external user;
    generating a link having a link identifier; and
    storing information correlating the link identifier and information indicative of the electronic content and identification of the limited plurality of external users.

16. The computer-implemented method of claim 15, wherein the limited plurality of external users is specified by an email address having a wildcard character.

17. The computer-implemented method of claim 15, wherein the limited plurality of external users is specified as an organization.

18. The computer-implemented method of claim 15, and further comprising receiving a hypertext transfer protocol message with the link from a requestor and causing the requestor to authenticate to the data storage system with an identity.

19. The computer-implemented method of claim 18, and further comprising accessing, with the data storage system, the information indicative of the limited plurality of users and determining whether the requestor's identity is a member of the limited plurality of external users.

20. The computer-implemented method of claim 19, wherein determining whether the requestor's identity is a member of the limited plurality of external users is based on whether an email address of the requestor has a domain that is specified in the information indicative of the limited plurality of users.

* * * * *